2 Sheets--Sheet 1.

N. FULLER.
Machine for Making Cigar-Lighters.

No. 168,835. Patented Oct. 19, 1875.

WITNESSES:
Maurice Andrew
John R. Heard.

INVENTOR:
Nathaniel Fuller
by Alban Andrew
his atty.

N. FULLER.
Machine for Making Cigar-Lighters.
No. 168,835. Patented Oct. 19, 1875.

WITNESSES:
Maurice Andrew
John R. Heard

INVENTOR:
Nathaniel Fuller
by Allan Andrew
his atty.

ced.

UNITED STATES PATENT OFFICE.

NATHANIEL FULLER, OF BOSTON, MASSACHUSETTS, ASSIGNOR OF ONE-HALF HIS RIGHT TO GEORGE W. BOWKER, OF SAME PLACE.

IMPROVEMENT IN MACHINES FOR MAKING CIGAR-LIGHTERS.

Specification forming part of Letters Patent No. 168,835, dated October 19, 1875; application filed June 14, 1875.

*To all whom it may concern:*

Be it known that I, NATHANIEL FULLER, of Boston, in the county of Suffolk and State of Massachusetts, have invented certain new and useful Improvements in Machines for Making Cigar-Lighters; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in planing-machines for making cigar and other lighters; and consists in the combination and arrangement of the devices employed, as hereinafter more fully set forth.

Figure 1:
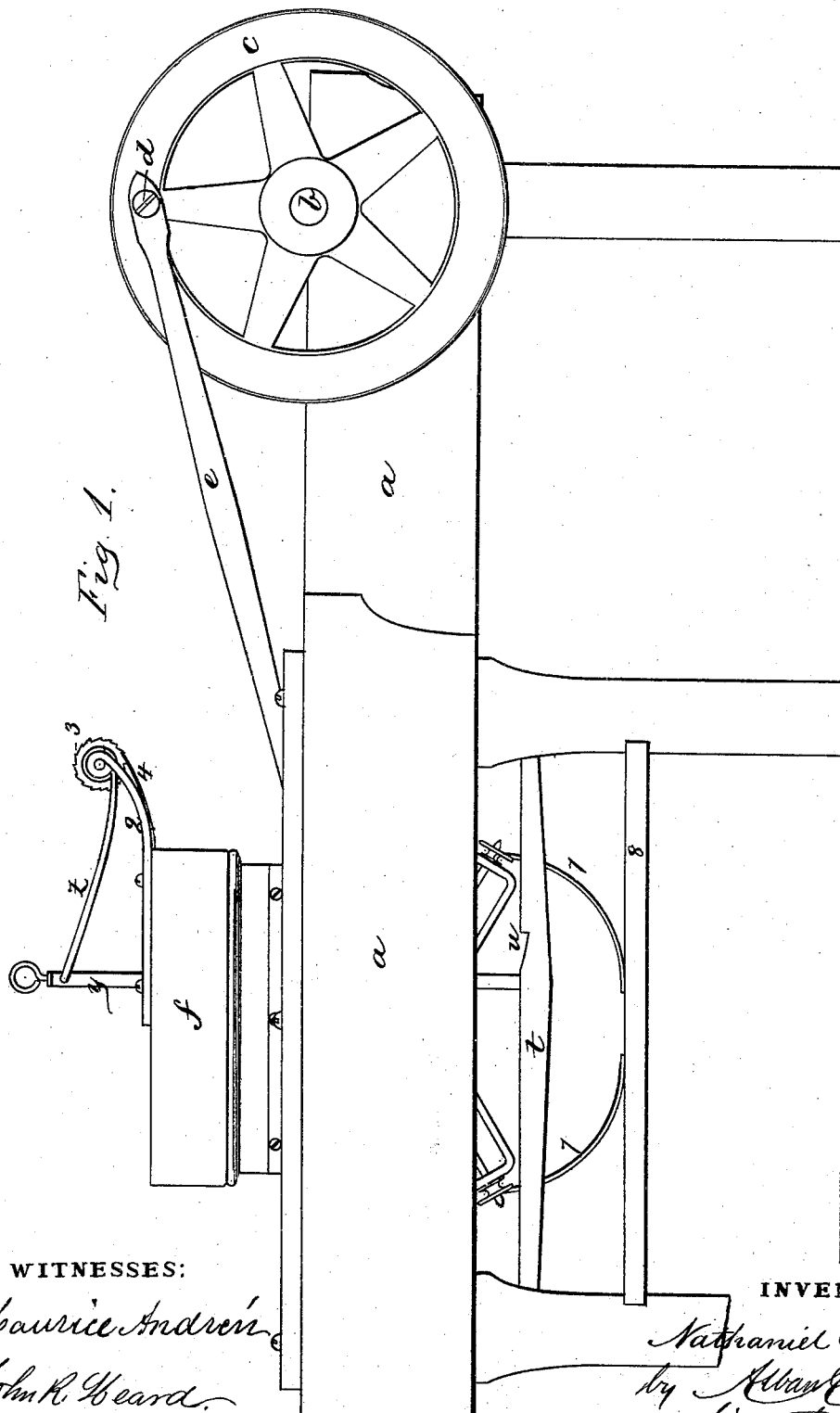
Figure 3:
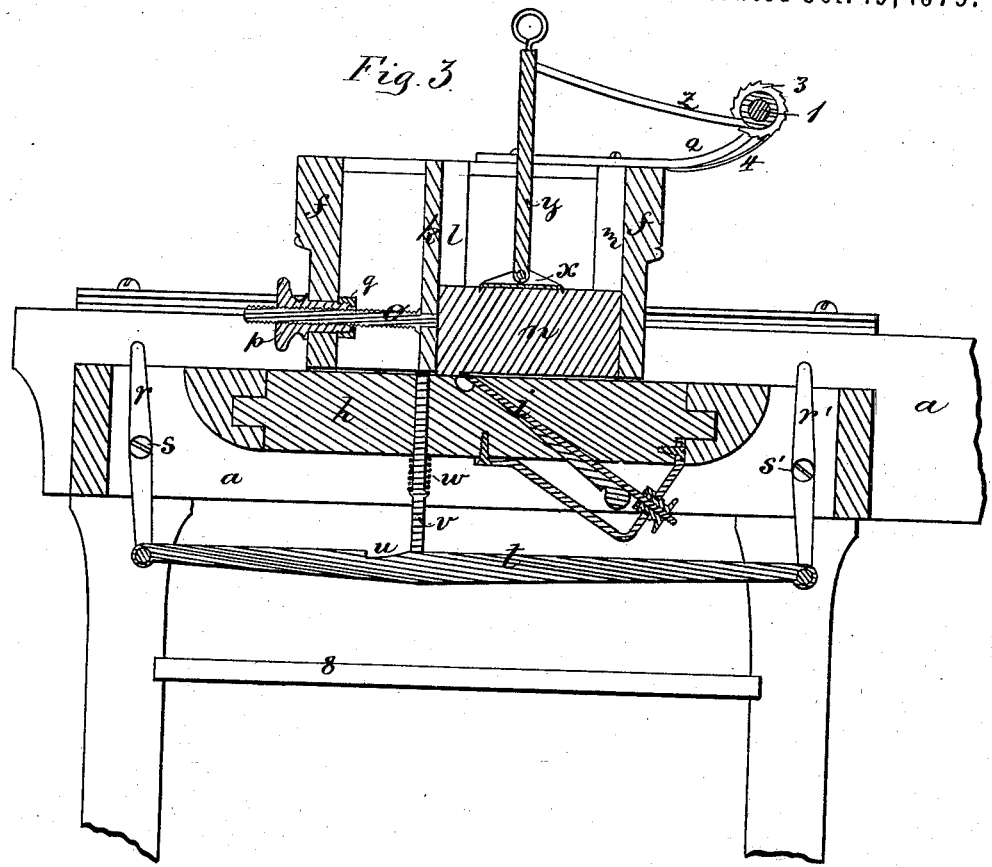
Figure 2:
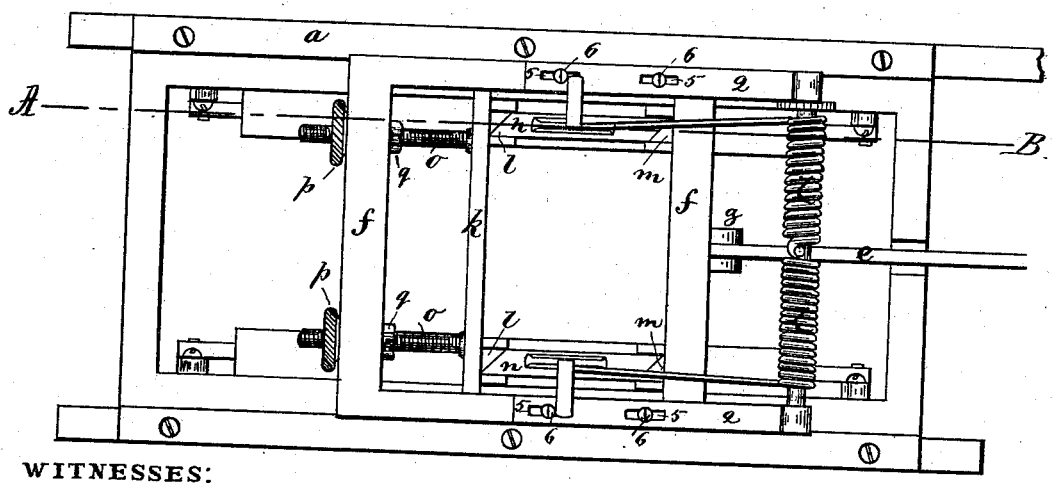

In the accompanying drawings, Figure 1 represents a side elevation of my invention. Fig. 2 represents a plan view of the same, with the exception of the fly-wheel and crank, and Fig. 3 represents a longitudinal section on the line A B, shown in Fig. 2.

Similar letters refer to similar parts wherever they occur on the drawings.

$a\ a$ represent the frame-work of the machine. $b$ is the rotary shaft. $c$ is the fly-wheel, with its crank-pin $d$ and connecting-rod $e$, the latter being jointed to the reciprocating carriage or block-holder $f$ at the place marked $g$, as shown in Fig. 3. $h\ h$ represent the stationary planes secured to the frame $a\ a$ in any suitable manner. Each plane is provided with an adjustable cutter, $i$, as shown in Fig. 3. The reciprocating carriage or block-holder F is provided with an adjustable partition, $k$, having grooves or guides $l\ l$, between which and corresponding grooves or guides $m\ m$ on the inside of the carriage $f$ are held the blocks of wood $n\ n$ during the operation of the machine. The partition $k$ is made adjustable by means of the screws $o\ o$ secured to the said partition, and thumb-nuts $p\ p$ located in the rear part of the carriage $f$, as shown in Fig. 3. $q\ q$ represent collars on the inside of the nuts $p\ p$, for the purpose of preventing the latter from being disconnected from the carriage $f$ during the adjustment of the partition $k$.

The automatic relief apparatus, for the purpose of relieving the block of wood from the cutter in the plane during the return stroke of said block, is constructed as follows: $r\ r'$ represent levers, movable on their fulcrums $s\ s'$ and jointed in their lower ends to a horizontal connecting-bar, $t$, provided with an incline, $u$, as shown in Fig. 3. The reciprocating carriage $f$, when approaching the end of its forward stroke, comes in contact with the upper end of the lever $r'$, whereby the latter and the rod $t$ are moved to the position shown in Fig. 3, causing the incline $u$ to force up the vertical rod $v$ through the plane $h$ and against the under side of the block that is being operated upon, thus relieving the cutter from contact with the block during its return stroke. A coiled spring forces the vertical rod $v$ downward when the reciprocating carriage $f$ in its return stroke comes in contact with the lever $r$, thereby admitting the wood to come in contact with the cutter during the forward stroke of the reciprocating carriage. The block of wood $n$ is automatically pressed against the plane $h$ by the employment of the presser-foot $x$ jointed to the rod $y$, that is acted upon with a downward pressure by means of the spring $z$ secured to the shaft 1 that is held in the adjustable bearing 2, and provided with a ratchet, 3, and pawl 4, by means of which the pressure of the spring $z$ can easily be regulated. The bearing 2 is provided with slot-holes 5 5, through which the screws 6 6 are inserted and screwed into the upper part of the carriage $f$, by means of which I am able to adjust the bearing 2, so that the presser-foot $x$ will come directly or nearly so over the middle of the block of wood that is operated upon, according to the length of the block of wood. 7 7 represent the guard-plates, located beneath the planes $h$, for the purpose of delivering the lighters from each plane in one and the same direction. The plates 7 7 are secured to a suitable support, 8, as shown.

Having thus fully described the nature, construction, and operation of my invention, I wish to secure by Letters Patent, and claim—

1. The combination, with the reciprocating carriage $f$ and the stationary planes $h\ h$, of the levers $r\ r'$, rod $t$, with its incline $u$, and the vertically-adjustable pin $v$, as and for the purpose set forth and described.

2. The combination, with the reciprocating carriage $f$, and the planes $h\ h$, of the guard-plates 7 7, as and for the purpose set forth.

In testimony that I claim the foregoing as my own invention, I have affixed my signature in presence of two witnesses.

NATHANIEL FULLER.

Witnesses:
 ALBAN ANDRÉN,
 JOHN R. HEARD.